United States Patent
Schilling

(10) Patent No.: US 6,262,971 B1
(45) Date of Patent: *Jul. 17, 2001

(54) MULTICHANNEL SPREAD-SPECTRUM PACKET

(75) Inventor: Donald L. Schilling, Sands Point, NY (US)

(73) Assignee: Golden Bridge Technology, Inc., West Long Branch, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/182,316

(22) Filed: Oct. 30, 1998

Related U.S. Application Data

(63) Continuation of application No. 08/692,782, filed on Aug. 2, 1996, now Pat. No. 5,862,133.

(51) Int. Cl.$^7$ .................................................. H04B 7/216
(52) U.S. Cl. ........................... 370/208; 370/335; 370/342
(58) Field of Search .................................. 370/335, 342, 370/350, 203, 204, 208–209, 210, 211; 375/130, 146, 147

(56) References Cited

U.S. PATENT DOCUMENTS

| | | | |
|---|---|---|---|
| Re. 35,402 | 12/1996 | Schilling | 375/200 |
| 4,672,658 | 6/1987 | Kavehrad et al. | |
| 4,694,467 | 9/1987 | Mui | 375/1 |
| 4,912,722 | 3/1990 | Carlin | 375/1 |
| 4,932,037 | 6/1990 | Simpson et al. | 375/1 |
| 5,022,046 | 6/1991 | Morrow, Jr. | |
| 5,166,951 | 11/1992 | Schilling | 375/200 |
| 5,291,486 | 3/1994 | Kuroyanagi | 370/451 |
| 5,321,721 | 6/1994 | Yamaura | 370/342 |
| 5,461,639 | 10/1995 | Wheatley, III et al. | 375/205 |
| 5,504,776 | 4/1996 | Yamaura et al. | 375/208 |
| 5,566,164 | * 10/1996 | Ohlson | 370/208 |
| 5,619,526 | * 4/1997 | Kim et al. | 370/335 |
| 5,619,527 | 4/1997 | Kuroyanagi et al. | 375/206 |
| 5,648,982 | 7/1997 | Durrant et al. | 375/206 |
| 5,862,133 | * 1/1999 | Schilling | 370/342 |
| 5,946,326 | * 8/1999 | Rinne | 370/486 |
| 5,970,047 | * 10/1999 | Suzuki | 370/210 |

FOREIGN PATENT DOCUMENTS

| | | |
|---|---|---|
| 6-326686 | 11/1994 | (JP) . |
| WO9314588 | 7/1993 | (WO) . |

* cited by examiner

*Primary Examiner*—Ricky Ngo
(74) *Attorney, Agent, or Firm*—David Newman; Chartered

(57) ABSTRACT

Encoding and transmitting packet-switched, spread-spectrum data. Data are encoded for privacy and to restrict intelligent receipt of the data to the intended recipient. The encoded data are demultiplexed into sub-data-sequence signals. The sub-data-sequence signals are spread-spectrum processed and combined as a multichannel spread-spectrum signal. The multichannel spread-spectrum signal is concatenated with a header to make a packet-spread-spectrum signal. The packet-spread-spectrum signal is transmitted over radio waves to a packet receiver. The packet receiver obtains timing for the multichannel spread-spectrum signal from the header. The packet receiver depsreads the multichannel spread-spectrum signal, and multiplexes the despread multichannel spread-spectrum signal as received-encoded data. The received-encoded data is decoded by the intended recipient and may be stored in a receiver memory or outputted directly.

61 Claims, 2 Drawing Sheets

MULTICHANNEL SPREAD-SPECTRUM PACKET

This patent stems from a continuation application of U.S. patent application Ser. No. 08/692,782, filed Aug. 2, 1996, entitled PACKET-SWITCHED SPREAD-SPECTRUM SYSTEM now U.S. Pat. No. 5,862,133. The benefit of the earlier filing date of the parent patent application is claimed for common subject matter pursuant to 35 U.S.C. §120.

BACKGROUND OF THE INVENTION

This invention relates to a packet-switched system, as might be used in an ethernet system, and more particularly to using multiple spread-spectrum channels to achieve a high processing gain and maintain a high capacity channel.

DESCRIPTION OF THE RELEVANT MAT

For a given bandwidth, processing gain and power level, spread-spectrum communications systems have a limited capacity for communicating information over a single channel. Consider the T1 network and T3 network, by way of example, and assume a spread-spectrum transmitter spread-spectrum processes the message data at a rate of 25 megachips per second. For the Ti network which communicates data at up to 1.544 megabits per second, a typical processing gain of 17 might be realized. For the T3 network, which can have data rates of 10 megabits per second, a processing gain of 2.5 might be realized. The low processing gains can result in channel degradation and loss of the advantages of spread-spectrum modulation such as resistance to fading caused by multipath and ability to share the spectrum with other spread-spectrum systems.

One technique for overcoming these problems is disclosed in U.S. Pat. No. 5,166,951, entitled, HIGH CAPACITY SPREAD SPECTRUM CHANNEL, by D. L. Schilling, which is incorporated herein by reference. In the '951 patent, data at a transmitter are demultiplexed into a plurality of sub-data-sequence signals, each sub-data-sequence signal is spread-spectrum processed into a spread-spectrum signal, and a plurality of spread-spectrum signals are combined and sent over a communications channel. At the receiver, the received signal is despread into the plurality of sub-data-sequence signals, and the plurality of sub-data-sequence signals multiplexed as the data.

The '951 patent does not teach how all transmitters and receivers can use identical chip-sequence signals, yet maintain network integrity.

SUMMARY OF THE INVENTION

A general object of the invention is a packet-switched system having high processing gain and high capacity.

Another object of the invention is a packet-switched system having sufficient processing gain using orthogonal chipping sequences.

An additional object of the invention is a packet-switched system having fast acquisition and synchronization, and low cost.

According to the present invention, as embodied and broadly described herein, a packet-switched system is provided comprising a plurality of packet transmitters that communicate with a plurality of packet receivers using radio waves. Each of the packet transmitters includes a transmitter-first-in-first-out (transmitter-FIFO) memory, an encoder, a demultiplexer, chip-sequence means, a plurality of product devices, a combiner, a header device, and a transmitter subsystem. Each packet receiver includes a translating device, a header-matched filter, a processor, a plurality of data-matched filters, a multiplexer, a decoder, and a receiver-first-in-first-out (receiver-FIFO) memory.

In the packet transmitter, the transmitter-FIFO memory stores data from a data input. The encoder encodes the data from the transmitter-FIFO memory as encoded data. By the term "encoder" for encoding data from the transmitter-FIFO memory is meant privacy type of encoding, such as scrambling or encrypting the data. The term "encoded data" as used herein is meant to include scrambled data or encrypted data. The demultiplexer demultiplexes the encoded data into a plurality of sub-data-sequence signals. A respective sub-data-sequence signal is outputted from a respective output of the demultiplexer. As used herein, the term "sub-data-sequence signal" is a demultiplexed part of the encoded data.

The chip-sequence means outputs a plurality of chip-sequence signals, and the plurality of product devices, or exclusive-OR gates, multiplies each of the sub-data-sequence signals by a respective chip-sequence signal. Each of the chip-sequence signals is orthogonal or has low correlation to the other chip-sequence signals in the plurality of chip-sequence signals. At the output of the plurality of product devices is a plurality of spread-spectrum channels.

The combiner algebraically combines the plurality of spread-spectrum channels as a multichannel-spread-spectrum signal. The header device adds, i.e., concatenates, the multichannel-spread-spectrum signal to a header. The header device outputs a packet-spread-spectrum signal. The header later provides chip-sequence synchronization at the receiver. The transmitter subsystem amplifies and transmits at a carrier frequency the packet-spread-spectrum signal using radio waves over a communications channel.

A packet-spread-spectrum signal, as used herein, is a spread-spectrum signal transmitted by one or more packet transmitters, and arriving at the input of one or more packet receivers. The packet-spread-spectrum signal has the header concatenated with the multichannel-spread-spectrum signal. Timing for the present invention may be triggered from the header as part of the packet-spread-spectrum signal. For the case of the packet-spread-spectrum signal, each packet has the header followed in time by the multichannel-spread-spectrum signal. The header and multichannel-spread-spectrum signal are sent as the packet-spread-spectrum signal, and the timing for the multichannel-spread-spectrum signal, and thus the data, in the packet-spread-spectrum signal is keyed from the header. The data in the multichannel-spread-spectrum signal may contain information such as digitized voice, signalling, adaptive power control (APC), cyclic-redundancy-check (CRC) code, etc.

The header, or preamble, is generated from spread-spectrum processing a header-symbol-sequence signal with a chip-sequence signal. The multichannel-spread-spectrum signal part of the packet-spread-spectrum signal is generated from spread-spectrum processing a plurality of sub-data-sequence signals with the plurality of chip-sequence signals, respectively.

The chip-sequence signal used for the header and data is common to all users. The use of a common chip-sequence signal achieves low cost, since circuitry for changing chip-sequence signals is not required.

At each of the packet receivers, the translating device translates the packet-spread-spectrum signal frog the carrier frequency to a processing frequency. The processing frequency may be at a radio frequency (RF), intermediate frequency (IF) or at baseband frequency. The processing frequency is a design choice, and any of the frequency ranges may be used by the invention. The header-matched filter detects the header in the packet-spread-spectrum signal. In response to detecting the header, the header-matched filter outputs a header-detection signal. The processor, in response to the header-detection signal, generates control and timing signals.

The plurality of data-matched filters despreads the multichannel-spread-spectrum signal embedded in the packet-spread-spectrum signal, as a plurality of received spread-spectrum channels. The multiplexer multiplexes the plurality of received spread-spectrum channels as received-encoded data. The decoder decodes the received-encoded data as received data. The receiver-FIFO memory stores the received data and outputs the received data to a data output. In an error-free environment, the received data are identical to the data input to the transmitter.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings.

Figure 1:
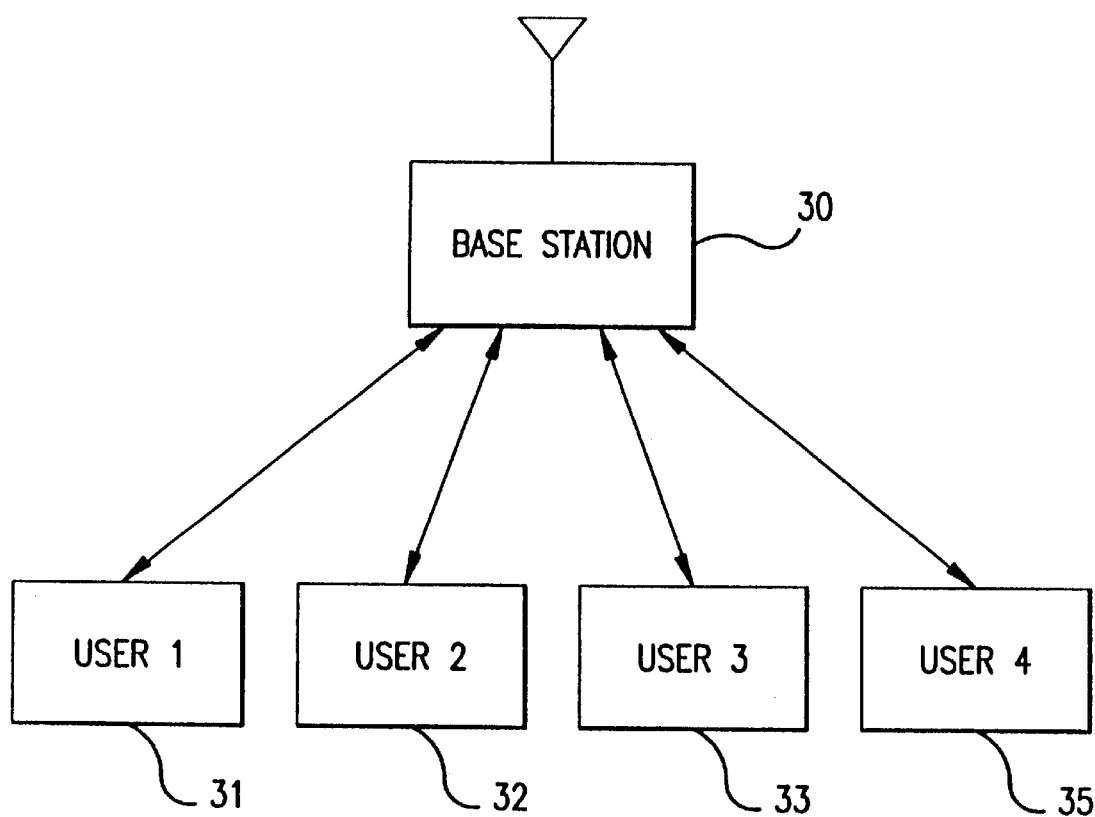
FIG. 1 illustrates a packet-switched system.

The present invention provides a new and novel spread-spectrum, packet-switched system, illustrated in FIG. 1, using a packet-spread-spectrum signal. The packet-switched spread-spectrum system might be used as part of a radio based ethernet system. The packet-switched system includes a base station 30 communicating with a plurality of users 31, 32, 33, 34. The packet-switched system alternatively could be used to communicate between two users, i.e., a peer-to-peer system, or several base stations could be accessed when needed. The base station and each user has a packet transmitter and a packet receiver. The present invention is illustrated, by way of example, with a packet transmitter transmitting the packet-spread-spectrum signal to a packet receiver.

The packet-spread-spectrum signal, in a preferred embodiment, includes a header, followed in time by a multichannel-spread-spectrum signal. The header is concatenated with the multichannel-spread -spectrum signal. The header is generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user defined, and in a usual practice, is used with a header-symbol-sequence signal. The header, in a preferred embodiment, is a chip-sequence signal used for the purpose of synchronization.

Each spread-spectrum channel of the multichannel-spread-spectrum signal part of the packet-spread-spectrum signal is generated similarly, from techniques well known in the art as used for the header, by spread-spectrum processing a sub-data-sequence signal with a respective chip-sequence signal. The sub-data-sequence signal may be derived from data, or an analog signal converted to data, signalling information, or other source of data symbols or bits. The chip-sequence signal can be user defined, and preferably is orthogonal to other chip-sequence signals used for generating the plurality of spread-spectrum channels.

Packet Switched System

The present invention broadly comprises a packet-switched-system for communicating data between a plurality of packet transmitters and a plurality of packet receivers, preferably using radio waves. The terms "packet transmitter" and "packet receiver", as used herein, denote the overall system components for transmitting and receiving, respectively, data.

Each packet transmitter includes transmitter-memory means, encoder means, demultiplexer means, spread-spectrum means, combiner means, header means, and transmitter means. The encoder means is coupled to the transmitter-memory means. The demultiplexer means, which is coupled to the encoder means, has a plurality of outputs. The spread-spectrum means is coupled to the plurality of outputs of the demultiplexer means. The combiner means is coupled between the spread-spectrum means and the header means.

The transmitter-memory means is coupled to a data input, and stores data from the data input. The encoder means encodes the data from the transmitter-memory means as encoded data. The demultiplexer means demultiplexes the encoded data into a plurality of sub-data-sequence signals, with a respective sub-data-sequence signal at a respective output of the demultiplexer means. The spread-spectrum means spread-spectrum processes each of the sub-data-sequence signals with a respective chip-sequence signal. The output of the spread-spectrum means is a plurality of spread-spectrum channels, with each spread-spectrum channel corresponding to one of the outputs of the demultiplexer means. The combiner means algebraically combines the plurality of spread-spectrum channels as a multichannel-spread-spectrum signal. The header means concatenates a header to the multichannel-spread-spectrum signal. The header is for chip-sequence synchronization. At the output of the header means is the packet-spread-spectrum signal. The transmitter means transmits, at a carrier frequency, the packet-spread-spectrum signal, using radio waves, over a communications channel.

Each of the packet receivers includes translating means, header-detection means, processor means, receiver-spread-spectrum means, multiplexing means, decoding means, and receiver-memory means. The translating means is coupled to the communications channel. The header-detection means is coupled between the translating means and the processor means. The receiver-spread-spectrum means is coupled to the translating means and to the multiplexing means. The decoding means is coupled between the multiplexing means and the receiver-memory means. At the output of the receiver-memory means are the data The translating means translates the received packet-spread-spectrum signal from the carrier frequency to a processing frequency. The processing frequency may be a radio frequency (RF), an intermediate frequency (IF), a baseband frequency, or other desirable frequency for processing data.

The header-detection means detects, at the processing frequency, the header embedded in the packet-spread-spectrum signal. The header-detection means outputs, in response to detecting the header, a header-detection signal.

The processor means generates control and timing signals. These signals are used for controlling sequences and timing of the invention.

The receiver-spread-spectrum means despreads the multichannel spread-spectrum signal of the packet-spread-spectrum signal, as a plurality of spread-spectrum signals. The multiplexing means multiplexes the plurality of spread-spectrum signals as the encoded data. The decoding means decodes the encoded data and the receiver memory means stores the data from the decoding means and outputs the data.

Figure 2:
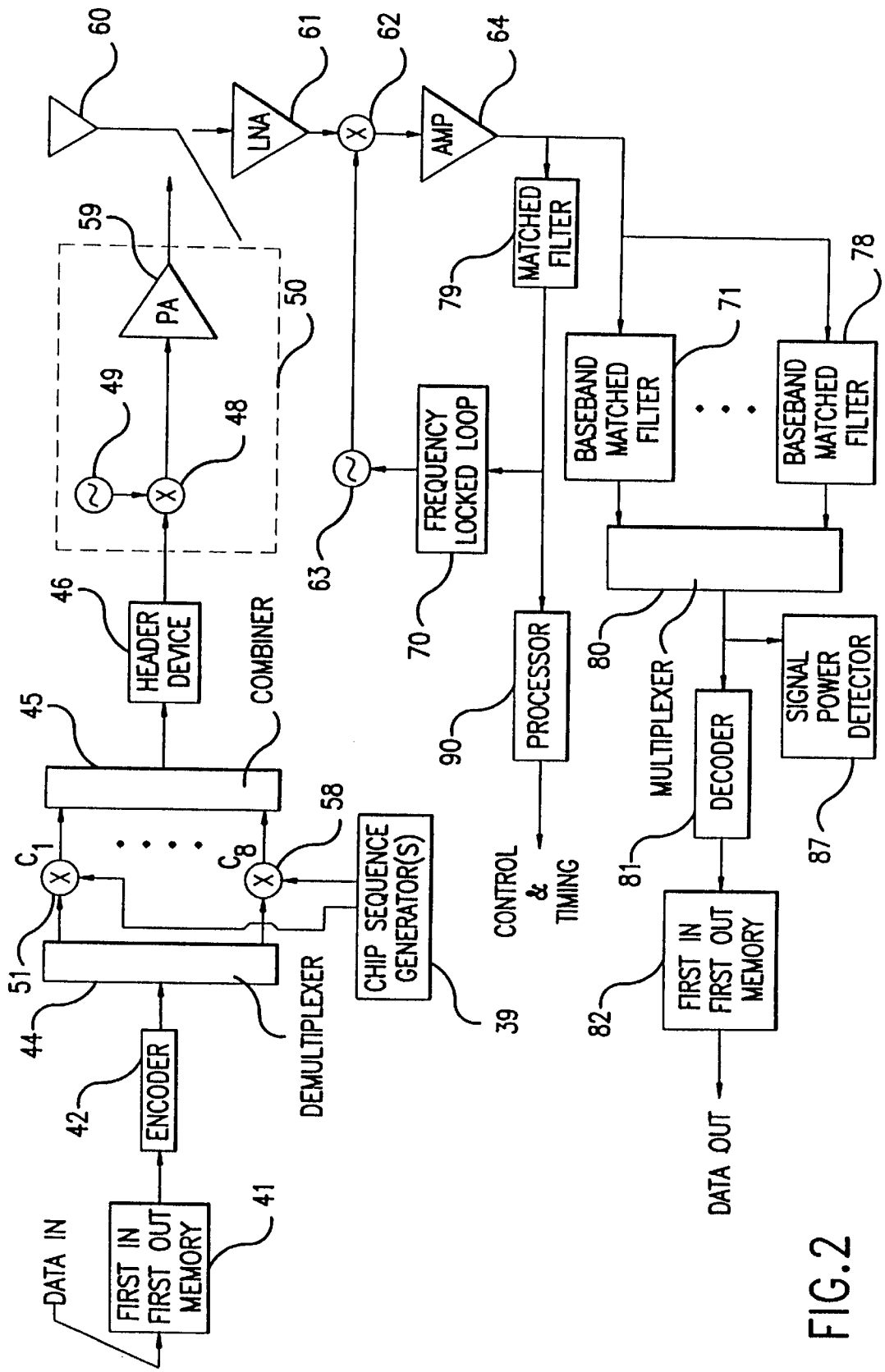
FIG. 2 is a block diagram of a packet transmitter and a packet receiver.

In the exemplary arrangement shown in FIG. 2, the transmitter-memory means is embodied as a transmitter-first-in-first-out (transmitter-FIFO) memory 41. The transmitter-FIFO memory 41 may employ random access memory (RAM) or other memory components as is well known in the art. The transmitter-FIFO memory 41 may be part of a digital signal processor (DSP); or, preferably, part of an application specific integrated circuit (ASIC).

For the case of an analog signal, an analog-to-digital converter would be inserted before the input to the transmitter-FIFO memory 41 for converting the analog signal to data. The analog-to-digital converter may be a one bit analog-to-digital converter, i.e., a hard limiter.

The encoder means is embodied as an encoder 42. The encoder 42 may be an encryptor or other privacy device. Encoders and privacy devices are well known in the art for encrypting or scrambling data. If security were not a primary concern, privacy may be achieved employing modulo two addition of a bit-sequence signal, generated from a linear shift register. Encryption sequences, generated from a Data Encryption Standard (DES) algorithm, by way of example, may be used when privacy is of high concern.

The encoder 42 encodes the data from the transmitter-FIFO memory 41, as encoded data. The encoding process may include using any of an encryption device, a privacy device, or other device for uniquely distinguishing, as encoded data, a particular data channel. The term encoded data, as used herein, broadly means data that are encrypted or scrambled for privacy.

The demultiplexing means is embodied as a demultiplexer 14. The demultiplexer 44 has a plurality of outputs, with each output having a demultiplexed portion of the encoded signal.

The spread-spectrum means is embodied as a chip-sequence means and a plurality of product devices 51, 58. The chip-sequence means may be embodied as a chip-sequence generator 39) for generating a plurality of chip-sequence signals. Alternatively, the chip-sequence means may be embodied as a plurality of EXCLUSIVE-OR gates coupled between the plurality of outputs of the demultiplexer and a memory device for storing the plurality of chip-sequence signals. In this embodiment, the memory device outputs a respective chip-sequence signal to the respective sub-data-sequence signal. A third alternative may include having the chip-sequence means embodied as a memory device, with appropriate detection circuit so that in response to a particular data symbol or data bit at the output of a particular output the demultiplexer, a chip-sequence signal is substituted for that data symbol or data bit. The chip-sequence means may also be embodied as any other technology known in the art capable of outputting a plurality of chip-sequence signals.

The combining means is embodied as a combiner 45, the header means is embodied as a header device 46 for concatenating a header with data, and the transmitter means is embodied as a transmitter subsystem 50. The transmitter subsystem may include an oscillator 49 and multiplier device 48 for shifting a signal to a carrier frequency, and a power amplifier 59 and/or other circuitry as is well known in the art for transmitting a signal over a communications channel. The signal is transmitted using an antenna 60.

As shown in FIG. 2, the encoder 42 is coupled between the transmitter-FIFO memory 41 and the demultiplexer 44. The chip-sequence generator 39 is coupled to the plurality of product devices 51, 58. The combiner 45 is coupled between the plurality of product devices 51, 58 and the header device 46, and the header device 46 is coupled to the transmitter subsystem 50.

The transmitter-FIFO memory 41 receives data from a data input, and stores the data.

The encoder 42 encodes the data from the transmitter-FIFO 41 as encoded data. The encoder 42 encodes the data using privacy type of encoding, i.e., scrambling the data or encrypting the data. Thus, the encoded data are scrambled data or encrypted data. The encoder 42 is necessary for distinguishing data from different users. By having the proper key for decoding the encoded data, data from a particular user are distinguished from data from other users. Thus, the encoding of the data is what defines a user's channel, unlike other multichannel spread-spectrum systems, where a user's channel is defined by a particular chip-sequence signal. By encoding the data with encoder 42, a common set of chip-sequence signals can be used by all users, reducing cost of having matched filters or correlators. The reduced cost is achieved since, at a receiver, one set of matched filters or correlator is required for the despreading the multichannel-spread-spectrum signal from all users, and different sets of matched-filters or correlators are not required for each user.

The demultiplexer 44 demultiplexes the encoded data into a plurality of sub-data-sequence signals, with a respective sub-data-sequence signal at a respective output of the demultiplexer 44.

The chip-sequence generator 39 generates a plurality of chip-sequence signals. Each of the chip-sequence signals of the plurality of chip-sequence signals has low correlation with the other chip-sequence signals in the plurality of chip-sequence signals, and is preferably orthogonal to the other chip-sequence signals in the plurality of chip-sequence signals.

The plurality of product devices 51, 58, for example, may be embodied as a plurality of EXCLUSIVE-OR gates coupled between the plurality of outputs of the demultiplexer 44 and the chip-sequence means. Each EXCLUSIVE-OR gate multiplies a respective sub-data-sequence signal from the demultiplexer, by a respective chip-sequence signal from the chip-sequence generator 39.

The plurality of product devices 51, 58 multiplies each of the sub-data-sequence signals by a respective chip-sequence signal. At the output of the plurality of product devices 51, 58 is a plurality of spread-spectrum channels, respectively.

A particular spread-spectrum channel is identified by the chip-sequence signal that was used to spread-spectrum process the particular sub-data sequence signal.

The combiner 45 algebraically combines the plurality of spread-spectrum channels, and outputs the combined signal as a multichannel-spread-spectrum signal. Preferably, the combiner 45 combines the plurality of spread-spectrum channels linearly, although some nonlinear process may be involved without significant degradation in system performance.

The header device 46 concatenates a header to the multichannel-spread-spectrum signal. At the output of the header device 46 is the packet-spread-spectrum signal. The header is for chip-sequence synchronization at the receiver.

The transmitter subsystem 50 transmits, at a carrier frequency, the packet-spread-spectrum signal using radio waves over a communications channel. The transmitter subsystem 50 of the packet transmitter includes appropriate filters, power amplifiers and matching circuits coupled to an antenna 60. The transmitter subsystem 50 also may include a hard limiter, for hard limiting the packet-spread-spectrum signal before transmitting.

At the receiver, as shown in FIG. 2, the translating means is shown as a translating device 62 with oscillator 63 and frequency locked loop 70, the header-detection means is embodied as a header-matched filter 79, the processor means is embodied as a processor 90, the receiver-spread-spectrum means is embodied as a plurality of data-matched filters 71, 78, the multiplexing means is embodied as a multiplexer 80 and the decoding means is embodied as a decoder 81. The receiver-memory means is embodied as a receiver-first-in-first-out (receiver-FIFO) memory 82.

The translating device 62 is coupled through an antenna 61 to the communications channel and through an amplifier 64 to the header-matched filter 79. The translating device 62 is coupled to oscillator 63, and the oscillator 63 is coupled to frequency locked loop 70. The header-matched filter 79 is coupled to frequency locked loop 70. The processor 90 is coupled to the header-matched filter 79. The plurality of data-matched filters 71, 78 is coupled between the translating device 62 and the multiplexer 80. The decoder 81 is coupled between the multiplexer 80 and the receiver-FIFO memory 82.

The translating device 62 translates the received packet-spread-spectrum signal from the carrier frequency to a processing frequency. The translating device 62 may be a mixer, which is well known in the art, for shifting an information signal, which in this disclosure is the received packet-spread-spectrum signal, modulated at a carrier frequency to IF or baseband. The processing frequency may be RF, IF, at baseband frequency or other desired frequency for a digital signal processor. The signal for shifting the received packet-spread-spectrum signal is produced by oscillator 63.

The header-matched filter 79 detects, at the processing frequency, the header embedded in the packet-spread-spectrum signal. The term "header-matched filter" as used herein, is a matched filter for detecting the header, by having an impulse response matched to the chip-sequence signal of the header of the packet-spread-spectrum signal. In response to detecting the header, the header-matched filter 79 outputs a header-detection signal. The header-matched filter at a base station can detect the header embedded in the packet-spread-spectrum signal from all users, since the chip-sequence signal for the header and data is common to all users.

The frequency locked loop 70 is frequency locked in response to the header-detection signal. The frequency locked loop 70 locks the frequency of the oscillator 63 to the carrier frequency of the received packet-spread-spectrum signal. Circuits for frequency locked loops, and their operation, are well known in the art.

The processor 90, in response to the header-detection signal, generates control and timing signals. The control and timing signals are used for controlling sequences and timing of the invention.

Each of the plurality of data-matched filters 71, 78 has an impulse response matched to a chip-sequence signal of a respective one of the plurality of chip-sequence signals. The plurality of data-matched filters 71, 78 despreads the multichannel-spread-spectrum signal of the packet-spread-spectrum signal as the plurality of received spread-spectrum channels.

Each chip-sequence signal in the plurality of chip-sequence signals is different, one from another. The plurality of chip-sequence signals, however, is common to all users. Thus, the plurality of data-matched filters 71, 78 can detect the plurality of chip-sequence signals from any of the users.

The multiplexer 80 multiplexes the plurality of received spread-spectrum channels as the received-encoded data. The received-encoded data, in an error-free environment, is the same as the encoded data that was generated at the packet transmitter.

The decoder 81 decodes the received-encoded data as the received data. The decoding is what distinguishes one user from another, since each user encodes with a different privacy type of encoding. For example, a first user and a second user may encode first data and second data, respectively, using a first key and a second key for the DES. Alternatively, the first user and the second user might encode first data and second data, respectively, using modulo two addition of bits from linear shift register. In the linear register example, the first user would have a first set of taps or settings for generating a first bit sequence, and the second user would have a second set of taps or settings for generating a second bit sequence. The second bit sequence would therefore be different from the first bit sequence.

If the decoder 81 were set to decode with the first key, then either the first data would appear at the output of decoder 81, or non-decoded data would appear at the output of decoder 81. The presence of non-decoded data would be rejected by the decoder 81. The presence of first data, which would be detected by the presence of a correct data sequence in the header or data portion of the packet, would pass to the receiver-FIFO memory 82. A correct data sequence might be a particular combination of bits, indicating proper decoding. The receiver-FIFO memory 82 stores the received data and has the data present at an output.

The present invention also comprises a method. The method includes the steps of storing data in a memory and encoding the data from the memory as encoded data. The data are demultiplexed using a demultiplexer, into sub-data sequence signals. The method includes generating a plurality of chip-sequence signals, and multiplying each of the sub-data-sequence signals by a respective chip-sequence signal, thereby generating a plurality of spread-spectrum channels.

The steps include algebraically combining the plurality of spread-spectrum channels as a multichannel-spread-spectrum signal, concatenating a header to the multichannel-spread-spectrum signal to generate a packet-spread-spectrum signal, and transmitting on a carrier frequency the packet-spread-spectrum signal over a communications channel using radio waves.

The steps include, at a packet receiver, translating the packet-spread-spectrum signal from the carrier frequency to a processing frequency, and detecting, at the processing frequency, the header embedded in the packet-spread-spectrum signal. The chip-sequence signal used for the header and the data is common to all uses. In response to detecting the header, the method includes outputting a header-detection signal and generating control and timing signals. The steps also include despreading the multichannel-spread-spectrum signal of the packet-spread-spectrum signal as a plurality of received spread-spectrum channels. The plurality of received spread-spectrum channels are multiplexed as received-encoded data. The steps include decoding the received-encoded data as received data, and storing the received data in a memory for output to a data output.

The packet-switched system is a wideband code division multiple access (W-CDMA) system, capable of transmitting, in a particular application, 9.6 megabits per second of data. For example, the following discussion assumes operation in the frequency band 2.4–2.483 GHz, although operation in other bands is possible. Preferred bandwidths are 26 MHz, available in Japan, and 70 MHz, for operation in USA, but again other bandwidths are possible.

In order to achieve a high processing gain at these bandwidths the data are demultiplexed. In FIG. 2, 19.2 megachips per second and a demultiplex factor of eight is employed for 26 MHz bandwidth operation.

The circuit operation of FIG. 2 is as follows:

1. The data are entered mechanically or electrically into a transmitter-FIFO memory 41 and read out at a 9.6 megabits per second rate.
2. The data are encoded by encoder 42 and, in the example shown here, a linear pseudo-noise (PN) generator generates a PN-bit-sequence signal. Such techniques for generating a PN bit sequence are well known in the art. A 127 length section of the $2^{16}-1 \cong 64,000$ length pseudo-noise sequence is used. Each user has a different PN-bit sequence. There are 64,000 different, 127 length PN-bit sequences possible in the system illustrated. The encoded data are demultiplexed into eight, 9.6/8=1.2 megabits per second sub-data-sequence signals.
3. Each bit is spread using a 16 chip/bit code. The chip-sequence signals $C_1$–$C_8$ are each orthogonal to one another, i.e., $C_i \cdot C_j = 0$, $i \neq j$.

Obtaining orthogonal chip-sequence signals is well known In a preferred embodiment, the standard procedure of taking a chip-sequence signal of length 15 is used and called $g(i)$; the chip-sequence signal is shifted by $n=1, 2, \ldots, 15$ to yield the code words $g(i-n)$ $n=1, \ldots, 15$. Each codeword is of length 15. Each chip-sequence signal is then increased by one chip by adding a zero chip as the last chip. Thus $\{\{g(i-n)\}, 0\}$ contains 16 chips and chip-sequence signals for different n are orthogonal.
4. The sub-data-sequence signals, i.e., the multichannel-spread-spectrum signal, are concatenated with a header by a header device 46. In this example the header is a chip-sequence signal, 3,360 chips long.
5. Each user has the same header and the same set of spreading chip-sequence signals.
6. The number of chips/bit can be any number e.g., 4, 8, 16, 32. The key is that different chip-sequence signals, $C_i \cdot C_j$, are orthogonal. This enhances processing gain (PG) for increased interference immunity.

In other systems, only one user can transmit at a time and, if two users transmit simultaneously, a collision will occur mad packet signals from both users will not be received correctly. In the packet-switched system of the present invention, two packet-spread-spectrum signals can be received simultaneously; a third may cause errors.

Clearly, two or three or more simultaneous transmissions depend only on the processing gain which is a design parameter and not fundamental to the present invention.

7. The spread data is upconverted and amplified by transmitter subsystem 50 and transmitted. A typical link analysis is included as Table 1.

The received signal is amplified in a low noise amplifier 61 (LNA) and down-converted, by mixer 62 with a signal from a local oscillator 63, to baseband. The signal is then amplified by amplifier 64 and hard limited by a hard limiter. The amplifier 64 may include the hard limiter.

8. The received signal is detected by the header-matched filter 79 and then by the plurality of data-matched filters 71, 78. The output of the header-matched filter 79 goes to the frequency locked loop (FLL) 70 to control the frequency. The frequency locked loop 70 design is standard as is known in the art. A preferred design is shown in FIG. 4. Analog designs also are possible.
9. The despread data are then multiplexed by multiplexer 80 and decoded by decoder 81.
10. Forward error correction (FEC) is not shown but can be employed.
11. The data can be stored in a receiver-FIFO memory 82 before outputting.
12. To minimize collisions, each receiver can read the matched filter output power using a signal power detector 87. When the power is low the user can transmit. When the power level is high, transmission is stopped.
13. The processor 90 handles all control and timing functions.
14. Matched filter acquisition and tracking are not shown for simplicity since techniques for these functions are well known in the art.

TABLE 1

Link Budget (Frequency = 2.4 Ghz; Bandwidth 70 MHz)

| | Parameter | Units | Forward Link | Reverse Link |
|---|---|---|---|---|
| a. | Transmit Power | dBm | 20 | 20 |
| b. | Transmit Antenna Gain | dB | 0 | 0 |
| c. | Receive Antenna Gain | dB | 0 | 0 |
| d. | EIRP | dBm | 20 | 20 |
| e. | Range | km | 0.4 | 0.4 |
| f. | Range Loss | dB | −88 | −88 |
| g. | Receive Signal Power | dBm | −68 | −68 |
| h. | Noise Figure | dB | 6 | 6 |
| i. | Noise Power Density | dBm/Hz | −174 | −174 |
| j. | Noise Power in 70 MHz | dBm | −90 | −90 |
| k. | Processing Gain | dB | 12 | 12 |
| l. | Received $E_b/N_o$ | dB | 34 | 34 |
| m. | Required $E_b/N_o$ | dB | 13 | 13 |
| n. | Margin for shadowing | dB | 21 | 21 |

TABLE 2

10 Mb/s Packet Switching Specifications

| Equipment | Base | Terminal |
|---|---|---|
| Operating Band | 2400–2480 MHz | 2400–2480 MHz |
| Bandwidth | 70 MHz | 70 MHz |

TABLE 2-continued

10 Mb/s Packet Switching Specifications

| Equipment | Base | Terminal |
|---|---|---|
| RF Bandwidth | 70 MHz | 70 MHz |
| Duplex Method | packet switched | packet switched |
| Multiple Access Technique | GBT-CDMA | GBT-CDMA |
| Number of Transmitter Chip-Sequences | $2^{31}-1$ | $2^{31}-1$ |
| TX data Rate: Traffic Signalling/APC | 9.6 Mb/s | 9.6 Mb/s |
| Control Frame Length | variable | variable |
| Data Modulation | BPSK | BPSK |
| Spreading Technique | Direct Sequence | Direct Sequence |
| Sequence Length | | |
| Header | 48 chips | 48 chips |
| Data | 16 chips | 16 chips |
| Chip Rate | 38.4 Mchips/s | 38.4 Mchips/s |
| Processing Gain | 12 dB | 12 dB |
| Transmitter power (max) | 100 mW | 100 mW |
| Service Range (free space) | 0.4 km | 0.4 km |
| Number of Antenna Sectors | omni | omni |
| Capacity | | 2 simultaneous users |

TABLE 3

Link Budget (Frequency = 2.4 Ghz; Bandwidth = 26 MHz)

| | Parameter | Units | Forward Link | Reverse Link |
|---|---|---|---|---|
| a. | Transmit Power | dBm | 20 | 20 |
| b. | Transmit Antenna Gain | dB | 0 | 0 |
| c. | Receive Antenna Gain | dB | 0 | 0 |
| d. | EIRP | dBm | 20 | 20 |
| e. | Range | km | 0.8 | 0.8 |
| f. | Range Loss | dB | −100 | −100 |
| g. | Receive Signal Power | dBm | −80 | −80 |
| h. | Noise Figure | dB | 6 | 6 |
| i. | Noise Power Density | dBm/Hz | −174 | −174 |
| j. | Noise Power in 26 MHz | dBm | −94 | −94 |
| k. | Processing Gain | dB | 12 | 12 |
| l. | Received $E_b/N_o$ | dB | 26 | 26 |
| m. | Required $E_b/N_o$ | dB | 13 | 13 |
| n. | Margin for shadowing | dB | 13 | 13 |

TABLE 4

10 Mb/s Packet Switching Specification

| Equipment | Base | Terminal |
|---|---|---|
| Operating Band | 2400–2480 MHz | 2400–2480 MHz |
| RF Bandwidth | 26 MHz | 26 MHz |
| Duplex Method | Time Division Duplex | Time Division Duplex |
| Multiple Access Technique | GBT-CDMA | GBT-CDMA |
| Number of Transmitter Chip-Sequences | | $2^{31}-1$ |
| TX Data Rate: Traffic Signalling/APC | 384, 144, 128, 64, 32 Kb/s | 384, 144, 128, 64, 32 Kb/s |
| Forward Error Coding | Rate - ½Constraint Length - 7 Convolutional Code | Rate - ½Constraint Length - 7 Convolutional Code |
| Interleaver | 5 ms | 5 ms |
| Control Frame Length | 500 μsec | 500 μsec |
| Data Modulation | BPSK | BPSK |
| Spreading Technique | Direct Sequence | Direct Sequence |
| Sequence Length | 6,930,000 chips | 6,930,000 chips |
| Chip Rate | 38.4 Mchips/s | 38.4 Mchips/s |
| Processing Gain | 12 dB | 12 dB |

TABLE 4-continued

10 Mb/s Packet Switching Specification

| Equipment | Base | Terminal |
|---|---|---|
| Transmitter power (max) | 100 mW | 100 mW |
| Service Range (free space) | 0.8 km | 0.8 km |
| Number of Antenna | omni | omni |
| Capacity | | 2 simultaneous users |

It will be apparent to those skilled in the art that various modifications can be made to the packet-switched spread-spectrum system of the instant invention without departing from the scope or spirit of the invention, and it is intended that the present invention cover modifications and variations of the packet-switched spread-spectrum system provided they come within the scope of the appended claims and their equivalents.

What is claimed is:

1. A packet-switched system for communicating data, comprising:
   a plurality of packet transmitters, each packet transmitter including,
   a transmitter-first-in-first-out (transmitter-FIFO) memory, coupled to a data input, for storing data;
   a demultiplexer, coupled to said FIFO memory and having a plurality of outputs, for demultiplexing the stored data into a plurality of sub-data-sequence signals, with a respective sub-data-sequence signal at a respective output of said demultiplexer;
   chip-sequence means for outputting a plurality of chip-sequence signals, with each chip-sequence signal orthogonal to the other chip-sequence signals in said plurality of chip-sequence signals;
   a plurality of product devices, coupled to the plurality of outputs of said demultiplexer, respectively, and to said chip-sequence means, for multiplying each of the sub-data-sequence signals by a respective chip-sequence signal, thereby generating a plurality of spread-spectrum channels;
   a combiner, coupled to the plurality of product devices, for algebraically combining the plurality of spread-spectrum channels as a multichannel-spread-spectrum signal;
   a header device, coupled to said combiner, for concatenating a header for chip-sequence synchronization, to the multichannel-spread-spectrum signal, thereby generating a packet-spread-spectrum signal; and
   a transmitter subsystem, coupled to said header device, for transmitting on a carrier frequency the packet-spread-spectrum signal using radio waves over a communications channel.

2. The packet-switched system as set forth in claim 1, with said chip-sequence means including a chip-sequence generator for generating the plurality of chip-sequence signals.

3. The packet-switched system as set forth in claim 1, with said chip-sequence means including a memory for storing the plurality of chip-sequence signals.

4. A packet-switched system for communicating data, comprising:
   a plurality of packet transmitters, each packet transmitter including,
   transmitter-memory means, coupled to a data input, for storing data;

demultiplexer means, coupled to said transmitter-memory means and having a plurality of outputs, for demultiplexing the encoded data into a plurality of sub-data-sequence signals, with a respective sub-data-sequence signal at a respective output of said demultiplexer means;

spread-spectrum means, coupled to the plurality of outputs of said demultiplexer means, for spread-spectrum processing each of the sub-data-sequence signals by a respective chip-sequence signal, thereby generating a plurality of spread-spectrum channels, with the respective chip-sequence signal different from a each chip-sequence signal in a plurality of chip-sequence signals for spread-spectrum processing the plurality of sub-data sequence signals, respectively, and with the plurality of chip-sequence signals commonly used by the plurality of packet transmitters;

combiner means, coupled to the spread-spectrum means, for algebraically combining the plurality of spread-spectrum channels as a multichannel-spread-spectrum signal;

header means, coupled to said combiner means, for adding a header for chip-sequence synchronization, to the multichannel-spread-spectrum signal, thereby generating a packet-spread-spectrum signal; and transmitter means, coupled to said header means, for transmitting at a carrier frequency the packet-spread-spectrum signal using radio waves over a communications channel.

5. The packet-switched system as set forth in claim 4, with said spread-spectrum means including:

generating means for generating the plurality of chip-sequence signals; and a plurality of EXCLUSIVE-OR gates coupled between said demultiplexing means, said combiner means and said generating means, for multiplying the plurality of sub-data-sequence signals by the plurality of chip-sequence signals, respectively, thereby generating the plurality of spread-spectrum channels.

6. The packet-switched system as set forth in claim 4, with said spread-spectrum means including a memory for storing the plurality of chip-sequence signals.

7. The packet-switched system as set forth in claim 4, with said spread-spectrum-processing means including a plurality of product devices for multiplying each of the sub-data-sequence signals by a respective chip-sequence signal of the plurality of chip sequence signals.

8. The packet-switched system as set forth in claim 4, with said spread-spectrum means including a plurality of surface-acoustic-wave devices, with each surface-acoustic-wave device having an impulse response matched to a chip-sequence signal of the plurality of chip-sequence signals, respectively.

9. The packet-switched system as set forth in claim 4, with said receiver-spread-spectrum means including a plurality of data-matched filters, with each data-matched filter having an impulse response matched to a chip-sequence signal of the plurality of chip-sequence signals, respectively.

10. The packet-switched system as set forth in claim 4 with said receiver-spread-spectrum means including a plurality of surface-acoustic-wave devices, with each surface-acoustic-wave device having an impulse response matched to a chip-sequence signal of the plurality of chip-sequence signals, respectively.

11. The packet-switched system as set forth in claim 4 with said header-detection means including a header-matched filter having an impulse response matched to the header.

12. A method, using a packet transmitter and a packet receiver, comprising the steps of:

storing, at the packet transmitter, data from a data input, as stored data;

demultiplexing, at the packet transmitter, the stored data into a plurality of sub-data-sequence channels;

spread-spectrum processing, at the packet transmitter, the plurality of sub-data-sequence signals by a plurality of chip-sequence signals, respectively, thereby generating a plurality of spread-spectrum channels, with each of the plurality of chip-sequence signals different from other chip-sequence signals in the plurality of chip-sequence signals;

combining, at the packet transmitter, the plurality of spread-spectrum channels as a multichannel-spread-spectrum signal;

concatenating, at the packet transmitter, a header to the multichannel-spread-spectrum signal, thereby generating a packet-spread-spectrum signal;

transmitting, from the packet transmitter, on a carrier frequency using radio waves, the packet-spread-spectrum signal over a communications channel;

processing, at the packet receiver, the header in the packet-spread-spectrum signal, to generate a reference signal;

despreading, at the packet receiver, responsive to the reference signal, the multichannel-spread-spectrum signal embedded in the packet-spread-spectrum signal as a plurality of received spread-spectrum channels, respectively; and multiplexing, at the packet receiver, the plurality of received spread-spectrum channels as received data.

13. The method as set forth in claim 12, further including, between the steps of storing and demultiplexing, encoding the stored data as encoded data, with the step of demultiplexing the stored data including the step of demultiplexing the encoded data into the plurality of sub-data-sequence channels.

14. The method as set forth in claim 12, further including, between the steps of storing and demultiplexing, scrambling the stored data as encoded data, with the step of demultiplexing the stored data including the step of demultiplexing the encoded data into the plurality of sub-data-sequence channels.

15. The method as set forth in claim 12, further including, between the steps of storing and demultiplexing, encrypting the stored data as encoded data, with the step of demultiplexing the stored data including the step of demultiplexing the encoded data into the plurality of sub-data-sequence channels.

16. The method as set forth in claim 12, with the step of spread-spectrum processing including the step of multiplying the plurality of sub-data-sequence signals by the plurality of chip-sequence signals, respectively, thereby generating the plurality of spread-spectrum channels, with each chip-sequence signal in the plurality of chip-sequence signals different from other chip-sequence signals in the plurality of chip-sequence signals.

17. The method as set forth in claim 12, with the step of spread-spectrum processing including the step of multiplying the plurality of sub-data-sequence signals by the plurality of chip-sequence signals, respectively, thereby generating the plurality of spread-spectrum channels, with each chip-sequence signal in the plurality of chip-sequence signals orthogonal with respect to other chip-sequence signals in the plurality of chip-sequence signals.

18. The method as set forth in claim 12, 16 or 17, with the step of combining including the step of algebraically combining the plurality of spread-spectrum channels as the multichannel-spread-spectrum signal.

19. The method as set forth in claim 12, 16, or 17, with the step of concatenating including the step of concatenating the header to the multichannel-spread-spectrum signal at an initial point of the multichannel-spread-spectrum signal, thereby generating the packet-spread-spectrum signal.

20. The method as set forth in claim 12, 16, or 17, with the step of concatenating including the step of concatenating the header to the multichannel-spread-spectrum signal, with the header followed in time by the multichannel-spread-spectrum signal, thereby generating the packet-spread-spectrum signal.

21. The method as set forth in claim 12, 16 or 17, with the step of spread-spectrum processing including the step of outputting a respective chip-sequence signal of the plurality of chip-sequence signals in response to a respective sub-data-sequence signal of the plurality of sub-data-sequence signals, thereby generating the plurality of spread-spectrum channels, with each chip-sequence signal in the plurality of chip-sequence signals orthogonal with respect to other chip-sequence signals in the plurality of chip-sequence signals.

22. The method as set forth in claim 12, 16 or 17, with the step of spread-spectrum processing including the step of outputting a respective chip-sequence signal of the plurality of chip-sequence signals in response to a respective data symbol in a sub-data-sequence signal of the plurality of sub-data-sequence signals, thereby generating the plurality of spread-spectrum channels, with each chip-sequence signal in the plurality of chip-sequence signals orthogonal with respect to other chip-sequence signals in the plurality of chip-sequence signals.

23. The method as set forth in claim 12, with the step of processing the header further including the steps of:

detecting the header in the packet-spread-spectrum signal;

outputting, responsive to detecting the header, a header-detection signal; and generating, responsive to the header-detection signal, control and timing signals.

24. The method as set forth in claim 12 or 23, further including, after the step of multiplexing, the step of storing the received data.

25. The method as set forth in claim 12 or 23, further including, after the step of multiplexing, the step of decoding the received data.

26. The method as set forth in claim 12, further including, before the step of processing the header, translating the packet-spread-spectrum signal from a carrier frequency to a processing frequency.

27. The method as set forth in claim 26, further including, generating, responsive to the reference signal, control and timing signals.

28. A packet transmitter and a packet receiver, comprising:

transmitter-memory means for storing, at said packet transmitter, data from a data input, as stored data;

demultiplexing means, coupled to said transmitter-memory means, for demultiplexing, at said packet transmitter, the stored data into a plurality of sub-data-sequence channels;

spread-spectrum means, coupled to said demultiplexing means, for spread-spectrum processing, at said packet transmitter, the plurality of sub-data-sequence signals by a plurality of chip-sequence signals, respectively, thereby generating a plurality of spread-spectrum channels, with each of the plurality of chip-sequence signals different from other chip-sequence signals in the plurality of chip-sequence signals;

combiner means, coupled to said spread-spectrum means, for combining, at said packet transmitter, the plurality of spread-spectrum channels as a multichannel-spread-spectrum signal;

header means, coupled to said combine means, for concatenating, at said packet transmitter, a header to the multichannel-spread-spectrum signal, thereby generating a packet-spread-spectrum signal;

transmitter means for transmitting, from said packet transmitter, on a carrier using radio waves, frequency the packet-spread-spectrum signal over a communications channel;

header-detection means, coupled to the communications channel, for processing the header in the packet-spread-spectrum signal, to generate a reference signal;

receiver-spread-spectrum means, coupled to said header-detection means, responsive to the reference signal, for despreading, at said packet receiver, the multichannel-spread-spectrum signal embedded in the packet-spread-spectrum signal as a plurality of received spread-spectrum channels, respectively; and multiplexing means, coupled to said receiver-spread-spectrum means, for multiplexing, at said packet receiver, the plurality of received spread-spectrum channels as received data.

29. The packet transmitter and the packet receiver as set forth in claim 28, further including, between said transmitter memory means and said demultiplexer means, encoding means for encoding the stored data as encoded data, with said demultiplexer means including means for demultiplexing the encoded data into the plurality of sub-data-sequence channels.

30. The packet transmitter and the packet receiver as set forth in claim 28, further including, between said transmitter memory means and said demultiplexer means, encoding means for scrambling the stored data as encoded data, with said demultiplexer means including means for demultiplexing the encoded data into the plurality of sub-data-sequence channels.

31. The packet transmitter and the packet receiver as set forth in claim 28, further including, between said transmitter memory means and said demultiplexer means, encoding means for encrypting the stored data as encoded data, with said demultiplexer means including means for demultiplexing the encoded data into the plurality of sub-data-sequence channels.

32. The packet transmitter and the packet receiver as set forth in claim 28, with said spread-spectrum means including multiplying means for multiplying the plurality of sub-data-sequence signals by the plurality of chip-sequence signals, respectively, thereby generating the plurality of spread-spectrum channels, with each chip-sequence signal in the plurality of chip-sequence signals different from other chip-sequence signals in the plurality of chip-sequence signals.

33. The packet transmitter and the packet receiver as set forth in claim 28, with said spread-spectrum means including multiplying means for multiplying the plurality of sub-data-sequence signals by the plurality of chip-sequence signals, respectively, thereby generating the plurality of spread-spectrum channels, with each chip-sequence signal in the plurality of chip-sequence signals orthogonal with respect to other chip-sequence signals in the plurality of chip-sequence signals.

34. The packet transmitter and the packet receiver as set forth in claim 28, 32 or 33, with said combiner means including means for algebraically combining the plurality of spread-spectrum channels as the multichannel-spread-spectrum signal.

35. The packet transmitter and the packet receiver as set forth in claim 28, 32, or 33, with said header means including means for concatenating the header to the multichannel-spread-spectrum signal at an initial point of the multichannel-spread-spectrum signal, thereby generating the packet-spread-spectrum signal.

36. The packet transmitter and the packet receiver as set forth in claim 28, 32 or 33, with said header means including means for concatenating the header to the multichannel-spread-spectrum signal, with the header followed in time by the multichannel-spread-spectrum signal, thereby generating the packet-spread-spectrum signal.

37. The packet transmitter and the packet receiver as set forth in claim 28, with the said spread-spectrum means including spread-spectrum-memory means for outputting a respective chip-sequence signal of the plurality of chip-sequence signals in response to a respective sub-data-sequence signal of the plurality of sub-data-sequence signals, thereby generating the plurality of spread-spectrum channels, with each chip-sequence signal in the plurality of chip-sequence signals orthogonal with respect to other chip-sequence signals in the plurality of chip-sequence signals.

38. The packet transmitter and the packet receiver as set forth in claim 28, with said spectrum-spectrum means including spread-spectrum-memory means for outputting a respective chip-sequence signal of the plurality of chip-sequence signals in response to a respective data symbol in a sub-data-sequence signal of the plurality of sub-data-sequence signals, thereby generating the plurality of spread-spectrum channels, with each chip-sequence signal in the plurality of chip-sequence signals orthogonal with respect to other chip-sequence signals in the plurality of chip-sequence signals.

39. The packet transmitter and the packet receiver as set forth in claim 28, with said header-detection means including means for detecting the header in the packet-spread-spectrum signal, for outputting, responsive to detecting the header, a header-detection signal, and for generating, from the header-detection signal, control and timing signals.

40. The packet transmitter and the packet receiver as set forth in claim 28, 37 or 38, further including, after said multiplexing means, receiver-memory means for storing the received data.

41. The packet transmitter and the packet receiver as set forth in claim 28, 37 or 38, further including, after said multiplexing means, decoding means for decoding the received data.

42. The packet transmitter and the packet receiver as set forth in claim 28, further including translating means for shifting the packet-spread-spectrum signal from the carrier frequency to a processing frequency.

43. The packet transmitter and the packet receiver as set forth in claim 41, further including means for generating, responsive to the reference signal, control and timing signals.

44. A packet transmitter and a packet receiver, comprising:

a transmitter memory for storing, at the packet transmitter, data from a data input, as stored data;

a demultiplexer, coupled to the transmitter memory, for demultiplexing, at the packet transmitter, the stored data into a plurality of sub-data-sequence channels;

spread-spectrum means, coupled to the demultiplexer, for spread-spectrum processing, at the packet transmitter, the plurality of sub-data-sequence signals by a plurality of chip-sequence signals, respectively, thereby generating a plurality of spread-spectrum channels, with each of the plurality of chip-sequence signals different from other chip-sequence signals in the plurality of chip-sequence signals;

a combiner, coupled to the spread-spectrum means, for combining, at the packet transmitter, the plurality of spread-spectrum channels as a multichannel-spread-spectrum signal;

a header device, coupled to the combiner, for concatenating, at the packet transmitter, a header to the multichannel-spread-spectrum signal, thereby generating a packet-spread-spectrum signal;

a transmitter subsystem, coupled to the header device, for transmitting, from the packet transmitter, on a carrier frequency using radio waves, the packet-spread-spectrum signal over a communications channel;

a header-detection device, coupled to the communications channel, for processing the header in the packet-spread-spectrum signal to generate a reference signal;

receiver-spread-spectrum means, coupled to the header-detection device, responsive to the reference signal, for despreading, at the packet receiver, the multichannel-spread-spectrum signal embedded in the packet-spread-spectrum signal as a plurality of received spread-spectrum channels, respectively; and a multiplexer, coupled to the receiver-spread-spectrum means, for multiplexing, at the packet receiver, the plurality of received spread-spectrum channels as received data.

45. The packet transmitter and the packet receiver as set forth in claim 44, further including, between the transmitter memory and the demultiplexer, an encoder for encoding the stored data as encoded data, with the demultiplexer including means for demultiplexing the encoded data into the plurality of sub-data-sequence channels.

46. The packet transmitter and the packet receiver as set forth in claim 44, further including, between the transmitter memory and the demultiplexer, an encoder for scrambling the stored data as encoded data, with the demultiplexer including means for demultiplexing the encoded data into the plurality of sub-data-sequence channels.

47. The packet transmitter and the packet receiver as set forth in claim 44, further including, between the transmitter memory and the demultiplexer, and encoder for encrypting the stored data as encoded data, with the demultiplexer including means for demultiplexing the encoded data into the plurality of sub-data-sequence channels.

48. The packet transmitter and the packet receiver as set forth in claim 44, with the spread-spectrum means including a plurality of product devices for multiplying the plurality of sub-data-sequence signals by the plurality of chip-sequence signals, respectively, thereby generating the plurality of spread-spectrum channels, with each chip-sequence signal in the plurality of chip-sequence signals different from other chip-sequence signals in the plurality of chip-sequence signals.

49. The packet transmitter and the packet receiver as set forth in claim 44, with the spread-spectrum means including a plurality of product devices for multiplying the plurality of sub-data-sequence signals by the plurality of chip-sequence signals, respectively, thereby generating the plurality of spread-spectrum channels, with each chip-sequence signal in the plurality of chip-sequence signals orthogonal with respect to other chip-sequence signals in the plurality of chip-sequence signals.

50. The packet transmitter and the packet receiver as set forth in claim 44, 48 or 49, with the combiner including means for algebraically combining the plurality of spread-spectrum channels as the multichannel-spread-spectrum signal.

51. The packet transmitter and the packet receiver as set forth in claim 44, 48, or 49, with the header device including means for concatenating the header to the multichannel-spread-spectrum signal at an initial point of the multichannel-spread-spectrum signal, thereby generating the packet-spread-spectrum signal.

52. The packet transmitter and the packet receiver as set forth in claim 44, 48, or 49, with the header device including means for concatenating the header to the multichannel-spread-spectrum signal, with the header followed in time by the multichannel-spread-spectrum signal, thereby generating the packet-spread-spectrum signal.

53. The packet transmitter and packet receiver as set forth in claim 44, 48 ro 59, with the spread-spectrum means including a memory for outputting a respective chip-sequence signal of the plurality of chip-sequence signals in response to a respective sub-data-sequence signal of the plurality of sub-data-sequence signals, thereby generating the plurality of spread-spectrum channels, with each chip-sequence signal in the plurality of chip-sequence signals orthogonal with respect to other chip-sequence signals in the plurality of chip-sequence signals.

54. The packet transmitter and packet receiver as set for in claim 44, 48 or 49, with the spread-spectrum means including a memory for outputting a respective chip-sequence signal of the plurality of chip-sequence signals in response to a respective data symbol in a sub-data-sequence signal of the plurality of sub-data-sequence signals, thereby generating the plurality of spread-spectrum channels, with each chip-sequence signal in the plurality of chip-sequence signals orthogonal with respect to other chip-sequence signals in the plurality of chip-sequence signals.

55. The packet transmitter and the packet receiver as set forth in claim 44, with the header-detection device including means for detecting, at the processing frequency, the header in the packet-spread-spectrum signal, for outputting, responsive to detecting the header, a header-detection signal, and generating, from the header-detection signal, control and timing signals.

56. The packet transmitter and the packet receiver as set forth in claim 44 or 55, further including a receiver memory, coupled to the multiplexer, for storing the received data.

57. The packet transmitter and the packet receiver as set forth in claim 44 or 55, further including a decoder, coupled to the multiplexer, for decoding the received data.

58. The packet transmitter and the packet receiver as set forth in claim 44, further including a translating device for translating the packet-spread-spectrum signal from the carrier frequency to a processing frequency.

59. The method as set forth in claim 12, 16 or 17 with the step of outputting a respective chip-sequence signal of the plurality of chip-sequence signals in response to a respective data symbol in a sub-data-sequence signal of the plurality of sub-data-sequence signals, thereby generating the plurality of spread-spectrum channels, with each chip-sequence signal in the plurality of the chip-sequence signals different from other chip-sequence signals in the plurality of chip-sequence signals.

60. The packet transmitter as set forth in claim 28, with said spread-spectrum means including spread-spectrum-memory means for outputting a respective chip-sequence signal of the plurality of chip-sequence signals in response to a respective data symbol in a sub-data-sequence signal of the plurality of sub-data-sequence signals, thereby generating the plurality of spread-spectrum channels, with each chip-sequence signal in the plurality of the chip-sequence signals different from other chip-sequence signals in the plurality of chip-sequence signals.

61. The packet transmitter and the packet receiver as set forth in claim 60, further including, after said multiplexing means, decoding means for decoding the received data.

* * * * *